(No Model.)

S. C. HOPKINS & A. HIGGINS.
CAMERA TRIPOD HEAD.

No. 501,510. Patented July 18, 1893.

WITNESSES
Samuel P. Thrasher.
Matthew M. Blunt.

INVENTORS
Sylvanus C. Hopkins
Atkins Higgins
by A. H. Spencer
ATT'Y

UNITED STATES PATENT OFFICE.

SYLVANUS C. HOPKINS, OF BOSTON, AND ATKINS HIGGINS, OF CAMBRIDGE, MASSACHUSETTS.

CAMERA-TRIPOD HEAD.

SPECIFICATION forming part of Letters Patent No. 501,510, dated July 18, 1893.

Application filed March 27, 1893. Serial No. 467,681. (No model.)

*To all whom it may concern:*

Be it known that we, SYLVANUS C. HOPKINS, of Boston, in the county of Suffolk, and ATKINS HIGGINS, of Cambridge, in the county of Middlesex, State of Massachusetts, have jointly invented certain new and useful Improvements in Camera-Tripod Heads, of which the following, taken in connection with the accompanying drawings, is a specification.

This invention relates to camera-tripod heads, the object being to provide more efficient means for leveling them and for subsequently adjusting them to other positions without disturbing the original leveling.

Our invention consists in a tripod head having a base or body adapted to be secured firmly to the flat bottom of the camera by an independent screw and formed with a semispherical lower portion fitting loosely into the concavity of a skeleton plate which is supported upon the tripod legs, and has an enlarged central opening to permit its central adjustment, in combination with an adjustable hub fitting loosely beneath such skeleton plate and with a tightening screw having a shoulder bearing against the lower part of said hub and a rotatable threaded stem extending through said hub and plate and engaging with said body, whereby said screw is adapted to force the hub toward the convex part of the body and to thereby grip the skeleton plate interposed between them. By preference this skeleton plate is hinged at one edge to a marginal ring which is directly connected to the tripod legs and at the other edge is furnished with a screw which ordinarily holds the plate and ring together as one. When this screw is released the marginal ring remains stationary on the legs, but the other parts, with the camera attached to the flat upper surface of the body, may be moved through an angle of ninety degrees upon the hinges of the skeleton plate, so that the camera will stand in a vertical instead of a horizontal position, and may be changed at will from one to the other. Folding doubly-slotted links or braces support the joint.

Our invention includes this hinging feature and other important points, as hereinafter described and particularly recited in the appended claims.

Figure 1:
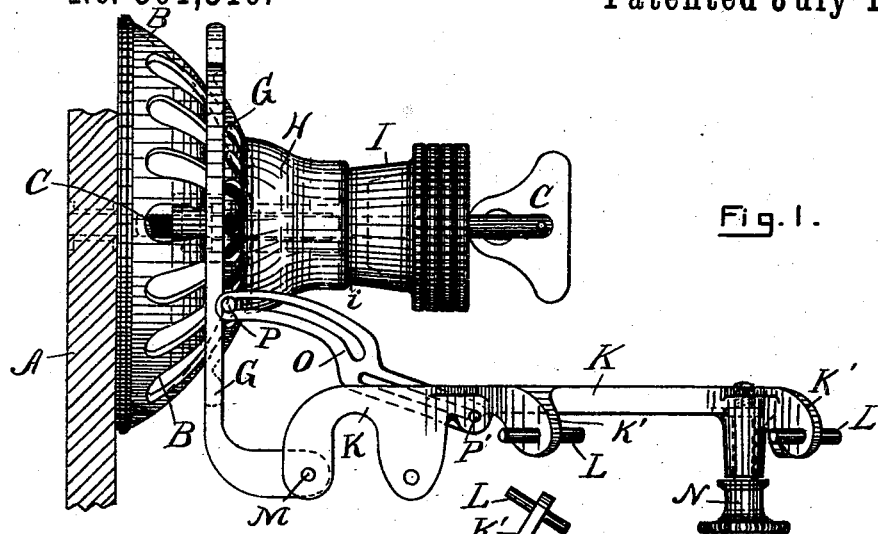
Figure 3:
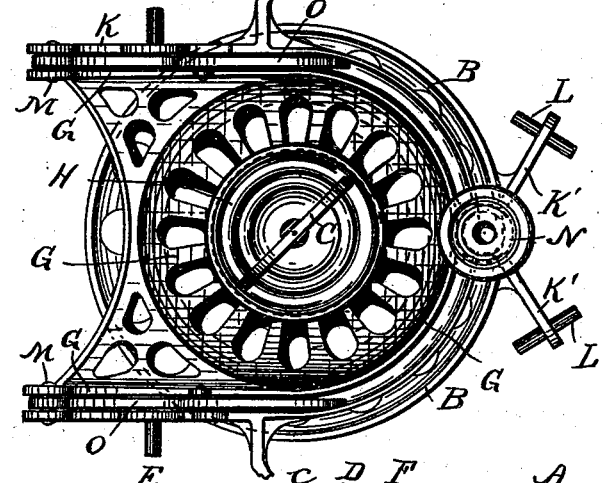
Figure 2:
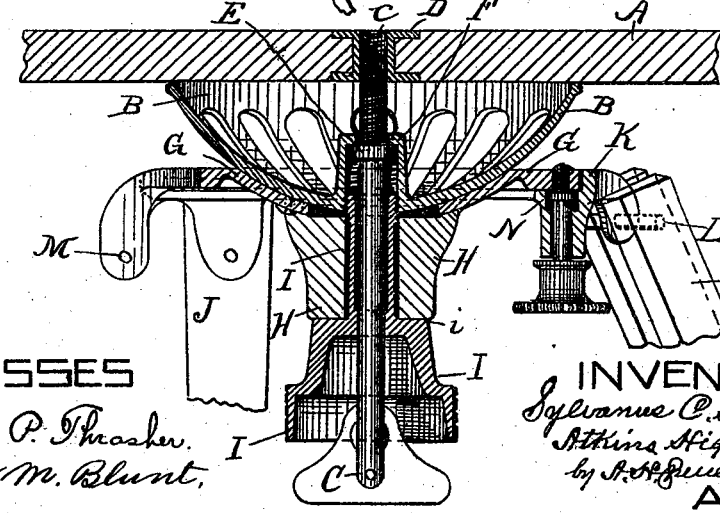

In the drawings, Figure 1 is a side elevation of the tripod-head, showing the marginal ring in a horizontal position and the skeleton plate hinged thereto turned up vertically, carrying the body, hub and tightening screw, and showing in section the bottom of the camera. Fig. 2 is a vertical section through the device, the parts being in their normal position as when the camera stands horizontally. Fig. 3 is a bottom plan of the device.

A represents the flat bottom of the camera, and B the body or base of the tripod-head, fixed firmly to such bottom by a screw C. This screw may be integral with and extend from the center of the body into a nut D, fixed in the camera bottom, but is preferably formed as shown in Fig. 2 with a projecting collar E, and a threaded tip extending up through a thimble F, at the center of the body B into said nut. The body may be of solid wood but is preferably an open metallic shell. In either case its exterior is of a rounded convex form about as shown.

G is a skeleton plate having a central concavity into which the convex body B fits loosely. It is formed with an enlarged central opening, shown black in the section Fig. 2, so that the body B, carrying the camera, may be adjusted laterally in either direction without the edges of this opening striking the screw C.

H is a hub, placed beneath the plate G and somewhat concave on its upper surface to fit against said plate, bridging across the central opening therein and thus capable of lateral adjustment with the camera, with relation to the plate. The hub H is pressed upwardly by a tightening screw I, shown in Fig. 2 as hollow, to surround the stem of the screw C of which its movement is independent.

The tightening screw I is threaded at its tip to engage with a female thread formed in the central thimble F of the body B, and it has a broad shoulder $i$ to bear against the hub and force it upwardly, to clamp the skeleton plate G between the hub and the convex body B.

The parts thus far described, with the camera, are supported upon the tripod legs J, which may be connected directly to the edges of the skeleton plate G. We, however, prefer to hinge this plate to a marginal ring K to which the legs are directly connected by the pintles L formed on flanges or ears K' of such ring. These pintles may project, as shown, in both directions from each of such ears or flanges, so that the legs may engage therewith by springing outwardly or inwardly. This peculiarity also appears when the legs of our tripod-head are connected directly to the plate G.

In Fig. 1 the plate G and ring K are distinctly shown hinged together at M, the plate being turned up vertically to place the instrument perpendicular to its usual position as is often desirable when the height of an object to be photographed exceeds its breadth. This change of position is made by releasing the screw N which works through the ring K at a point opposite to the hinges and engages by its threaded tip with a female screw in the plate G. Ordinarily this screw holds the plate down firmly to the ring K, as in Figs. 2 and 3, but it is readily released as in Fig. 1.

We strengthen the joint of the hinge by a suitable link or stop; and we have devised the peculiar doubly-slotted, self-folding links or braces O, Figs. 1 and 2. These links are solid at a central point and slotted thence almost to each end to receive and permit movement to the stop pins P P' fixed respectively in the plate G and ring K.

In Fig. 1 the pins are at the outermost ends of the slots, and the links thus form a positive stop to the movement of the hinged parts; while in Fig. 2 the links lie automatically folded between the parallel parts of the plate and ring adjacent to the hinges, and are so held by the position of the pins in the slots.

We claim as our joint invention—

1. In a tripod-head the base or body held firmly to the bottom of the camera by an independent screw and formed with a convex lower portion, a concave skeleton plate fitting loosely on such convex portion and formed with an enlarged central opening to provide for lateral adjustment, in combination with a hub fitting beneath said plate and with a tightening screw having a shoulder engaging the lower part of said hub and a rotatable threaded stem extending through said hub and plate and engaging with said base or body, substantially as set forth.

2. In a tripod-head, the convex base or body B, the concave plate G fitting thereon, and the hub H and a suitable clamping screw, in combination with the marginal ring K K' connected to the supporting legs and with hinges M and screw N connecting said plate and ring substantially as and for the purpose set forth.

3. In a tripod-head, the convex base or body B, the plate G, hub H and clamp screw I, whereby the camera is adjusted horizontally on its supporting legs, in combination with the marginal ring to which the plate G is hinged, and with the slotted link O and stop pins P P', serving to strengthen the joint, substantially as set forth.

In testimony whereof we have signed our names to this specification, in the presence of two subscribing witnesses, on this 12th day of January, A. D. 1893.

SYLVANUS C. HOPKINS.
ATKINS HIGGINS.

Witnesses:
  A. H. SPENCER,
  THOS. J. KENNY.